Sept. 27, 1938.  H. L. KRAEFT  2,131,140
CYCLE SADDLE
Filed June 10, 1935  2 Sheets-Sheet 1

INVENTOR.
HERMAN L. KRAEFT
BY
Bates, Goldrick & Teare
ATTORNEYS

Sept. 27, 1938.    H. L. KRAEFT    2,131,140
CYCLE SADDLE
Filed June 10, 1935    2 Sheets-Sheet 2

INVENTOR.
HERMAN L. KRAEFT
BY
Bates, Golrick, & Teare
ATTORNEYS

Patented Sept. 27, 1938

2,131,140

UNITED STATES PATENT OFFICE 2,131,140

CYCLE SADDLE

Herman L. Kraeft, Cleveland, Ohio, assignor to The Murray-Ohio Manufacturing Co., Cleveland, Ohio, a corporation of Ohio Application June 10, 1935, Serial No. 25,753

15 Claims. (Cl. 155—5.10)

This invention relates to a cycle saddle construction, and is particularly adapted for use on bicycles, tricycles, motorcycles, etc., employing a sheet-metal back-bone or saddle perch.

The present application is a continuation in part of my prior application, Serial No. 7,171, filed February 19th, 1935, now Patent No. 2,068,125 issued January 9th, 1937. Said application shows the arrangements of Figs. 1 to 4 hereof, the remainder of the present disclosure being the continuation matter.

An object is to provide an improved saddle construction and mounting therefor, combining a more pleasing appearance with proper functioning as a saddle.

A further object is to provide a cycle saddle supporting structure, adapted to be made substantially entirely from inexpensive sheet-metal parts.

Another object is to provide an adjustable saddle construction or support, by which a large variety of adjustments may be effected by a child or unskilled person.

A further specific object is to provide a saddle construction, capable of being made practically entirely from a few inexpensive sheet-metal parts, so arranged as to allow the necessary adjustments to fit the requirements and/or whims of the child, and which, both in appearance and in fact, will constitute a more unitary part of the vehicle on which mounted.

A further object is to provide a novel arrangement for cushioning a saddle frame adapted to be made from sheet metal or other hard substance.

A still further object is to provide a saddle construction for use in juvenile vehicles, which construction will have improved yielding characteristics in absorbing the impact of the body of the child and preventing shock to the child's body.

Still another object is to provide an improved and simplified spring suspension for cycle saddles.

Other objects will hereinafter appear in connection with the following description of the preferred forms illustrated herewith.

Figure 1:
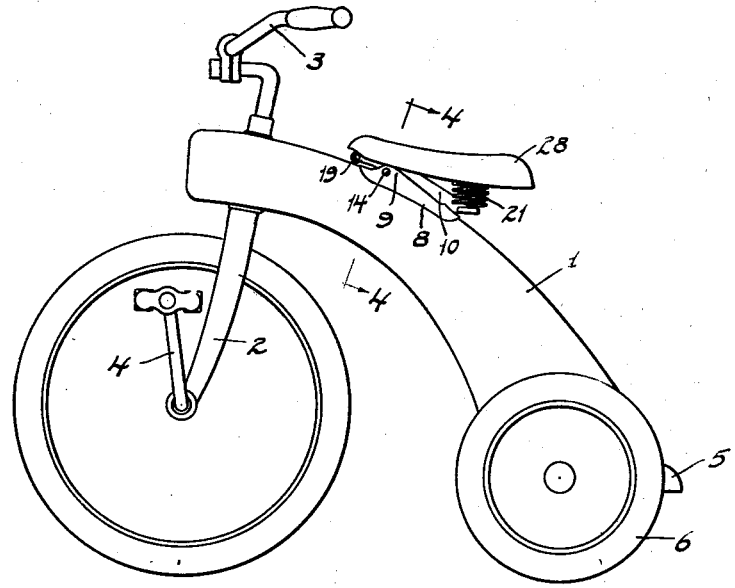
Figure 2:
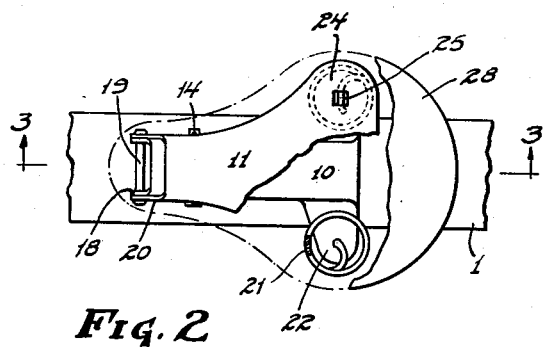
Figure 4:
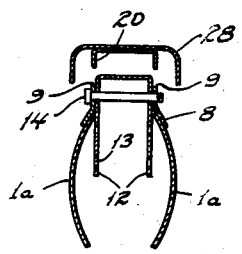
Figure 3:
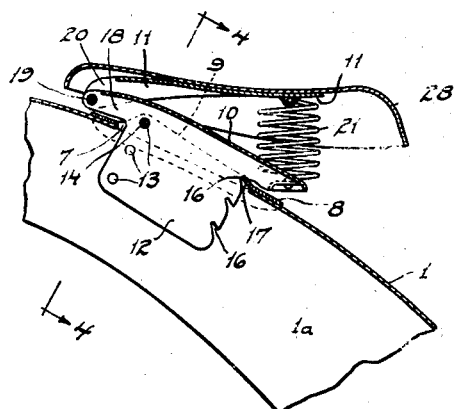
Figure 5:
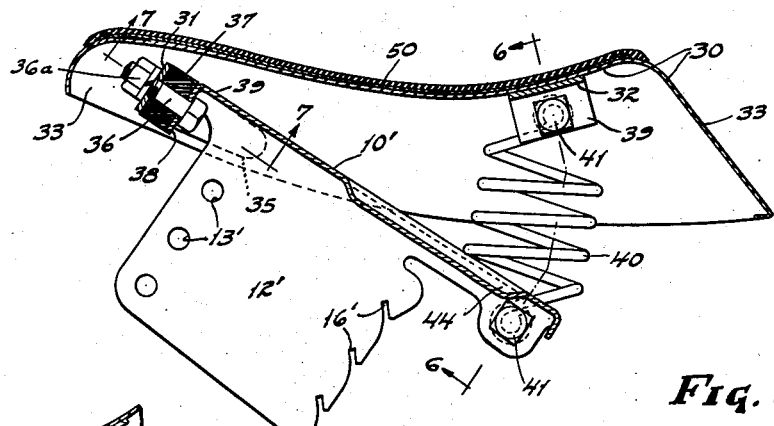
Figure 7:
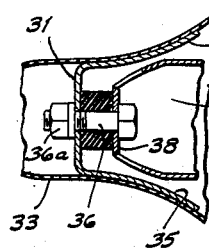
Figure 6:
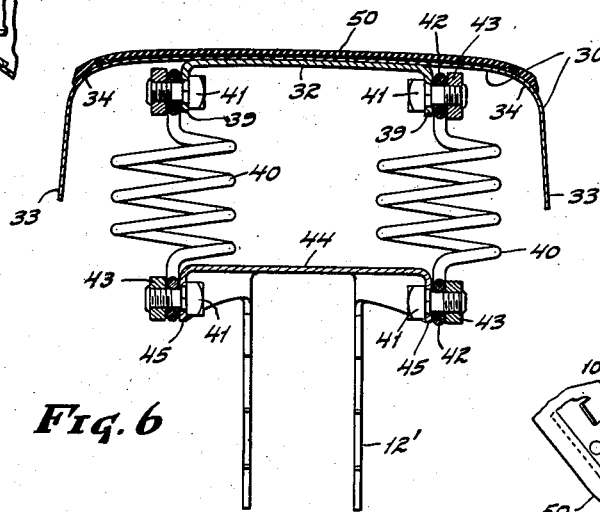
Figure 9:
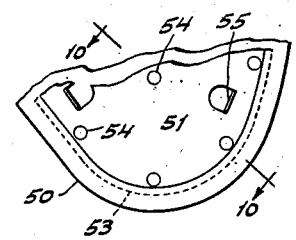
Figure 8:
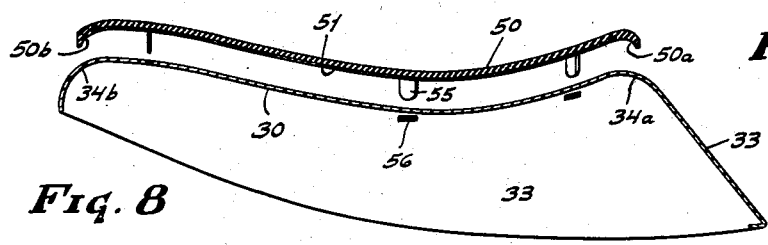
Figure 10:
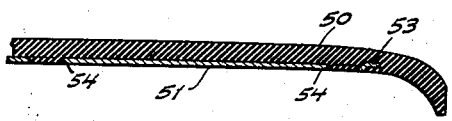

Referring to the drawings, Fig. 1 is a side elevation, showing one embodiment of the invention mounted on a velocipede; Fig. 2 is a plan view of the saddle of Fig. 1, partly broken away to show details of its construction; Fig. 3 is a central longitudinal sectional view, as indicated by the line 3—3 on Fig. 2; Fig. 4 is a transverse sectional view taken along the line 4—4 on Figs. 1 and 3; Fig. 5 is a view corresponding to Fig. 3, showing a modified form of saddle and mounting; Fig. 6 is a transverse sectional view, as indicated by the line 6—6 on Fig. 5; Fig. 7 is a detail or fragmentary sectional bottom plan, as indicated by the line 7—7 on Fig. 5; Fig. 8 is an exploded view showing, in longitudinal section, one form of composite saddle cushion or pad element and a main saddle frame member adapted to support it; Fig. 9 is a fragmentary bottom plan view of a portion of the cushion or pad element, and Fig. 10 is a somewhat enlarged fragmentary sectional view, as indicated by the line 10—10 on Fig. 9.

The saddle and supporting structure hereof are shown as mounted on a hollow back-bone or saddle perch 1, such as shown and claimed in my above-identified prior application, the back-bone comprising the sole connection between the front wheel supporting structure or fork assembly 2 (including handle bars 3 and pedal drive 4) and the rear chassis, a portion of which is indicated at 5. The chassis carries the rear wheel or wheels indicated at 6.

The construction of the back-bone is indicated by way of example in Fig. 4, wherein this is seen to comprise spaced, convex side walls 1a. The walls may, as in the parent application, comprise portions of a single shell or may comprise separate sections suitably joined at the top and/or bottom of the back-bone as desired.

The saddle support includes an adjustable bracket or post 10, which extends into a substantially rectangular opening 7 in the top wall of the back-bone; spaced plate or tongue portions 12 of the bracket lying between the walls 1a, as shown in Figs. 3 and 4.

The opening 7 may be reenforced continuously by a suitable metal plate 8, having an outer flange lying in face-to-face relationship with the underlying wall surfaces of the back-bone (welded thereto e. g.) and upwardly turned parallel flanges 9 forming side bearing surfaces for the plate portions 12 of the bracket 10. Alternatively, the ears 9 may be formed from the wall material of the back-bone.

The bracket 10 comprises, as shown, a generally U-shaped section of sheet-metal having the spaced parallel plate portions 12 integral therewith. Each of the plate portions has a vertically spaced series of apertures, as at 13, oppositely disposed for selectively receiving an attaching bolt or pin 14, (see Fig. 4) by which the forward end of the bracket 10 is detachably coupled with the upstanding ears 9 e. g., the pin passing through suitable aligned openings in the ears. The rearward marginal edges of the plate portions have comparatively deep transversely aligned notches 16, preferably corresponding in number and arrangement to the openings 13. These notches are selectively engageable as by a forwardly extending marginal tongue portion of the reinforce member 8, which thereby rigidly supports the rear end of the bracket.

The central opening in the reenforce member 8 and likewise the underlying opening 7 in the top wall of the back-bone are of sufficient longitudinal extent so that when the bolt or pin 14 is removed, the side plate portions of the bracket may be slid forwardly a sufficient distance to withdraw the notch 16 from engagement with the tongue 17, so that the tongue may be reengaged with others of said notches and the saddle raised or lowered as desired.

The arrangement described permits the saddle assembly to be tilted fore and aft, as by having the bolt or pin 14 pass through the intermediate pair of holes 13, and the tongue effect 17 occupy one or the other of the extreme notches 16. Other tilted positions may be obtained in like manner.

Above the back-bone the member 10 is extended forwardly, as at 18, and the side walls of the extension have aligned apertures adapted to receive a pivot bolt or pin 19 connecting a movable saddle-supporting frame member 11 with the bracket 10, so that the frame 11 is free to move up and down with relation to the bracket and back-bone.

The frame 11 is also adapted to be formed from sheet-metal. The general cuneiform shape of it is shown in Fig. 2, and the forward portion is U-shaped in transverse cross-section by reason of downwardly extending flanges 20, which straddle the extension 18 forming the pivot support for the pin 19, as well as guiding the saddle for movement in a true vertical plane.

It will be noted in Figs. 2 and 3, that the members 10 and 11 have laterally extending ear or wing formations at their rear portions forming spring seats for respective coil springs 21. As shown, the member 10 has spring seat ears at 22, apertured to receive the lower free ends of the springs which may be suitably hooked beneath the ears, and the member 11 has laterally extending ears 24 in superposed relation to the ears 22 and having down-struck shackle loops as at 25 for receiving and securing laterally bent upper ends of the springs 21. The spring attachment may be greatly modified, as there are many known suitable devices for the purpose.

In this particular form, the movable saddle frame member 11 supports a generally overlying saddle cover 28 forming the seat surface proper, said cover comprising say leather, relatively stiff fiber composition or any other suitable material. In some cases it may be made of metal, in which event it is preferably cushioned in the manner illustrated in Figs. 5 to 10, inclusive, to be later described.

Attention is called to the fact that the seat portion of the saddle lies very close to the back-bone as compared to the conventional saddle arrangement (using a bent bar as a saddle post) and that the various desired adjustments can be effected by the child himself, due to the simplicity of operations necessary to effect adjustment. The structure, moreover, is more sturdy and the necessary flexibility is obtained between the two main elements of the saddle mounting, so that the child's body is yieldingly supported over the cycle frame in any position of adjustment of the saddle.

Referring to Figs. 5, 6 and 7, the saddle supporting construction there shown is similar to that above described, the adjustable bracket or post member 10' having essentially the same arrangement of down-turned flanges 12' provided with sets of aligned fastener-receiving openings 13' and also rearwardly disposed notches 16' for engagement with an appropriate tongue effect on the cycle e. g. frame.

The pivoted yielding support for the saddle proper is, however, somewhat simplified and may be made at reduced cost. The part 30 which is, in effect, pivoted to the bracket 10', is a sheet-metal shell and practically corresponds in function to the part 11 of the previously described construction. The shell 30 is extended to afford in effect the actual seat surface i. e. it has the desired saddle shape and has, as shown, separate brackets 31 and 32, respectively, for pivotal and spring connections with the bracket member 10'.

To the above ends the shell is made generally cuneiform, as viewed in plan, is centrally depressed in conventional saddle form along its longitudinal axis, and is more or less arch shaped transversely throughout its length. The shell 30 has a continuous perimetral flange 33, curving downwardly from the central body in generous radii, as noted, for example, at 34, in Fig. 6 and 34a and 34b in Fig. 8.

The bracket 31 bridges the down-turned flange portions of the shell 30 at the narrow forward portion thereof, said bracket having arm portions 35 welded e. g. to the flanges 33 and a cross-connecting part apertured to loosely receive a bolt 36 extending through a block 37 of resilient material, such as rubber, and also, (loosely) through an opening in a vertical flange 38 at the forward end of the bracket extension 39. An appropriate nut 36a on the bolt is tightened sufficiently to maintain the resilient block in somewhat compressed condition, principally to avoid rattles, and to make the "pivot" connection remain snug, notwithstanding considerable wear of the parts in use.

The spring shackle forming bracket 32 at the rear portion of the saddle shell 30 is generally U-shaped and may be attached by welding to the underside of the shell and has down-turned ears 39 with transversely aligned apertures for receiving a shackle pin or shackle pins for the springs 40. The shackle pins, as shown, comprise separate bolts 41, having polygonal shanks fitting the openings in the ears 39, and the bolts pass through "eye" loop formations 42 at the ends of the springs. The bolts have appropriate nuts 43, and may be headed over beyond the nuts, as by riveting operations.

A similar arrangement is provided to connect the lower ends of the springs 40 to the bracket member 10', this having a rearward extension 44, provided with down-turned apertured ears or flanges 45 supporting the shackle pins (bolts as shown) passing through "eye" loops 42 on the springs. This manner of attaching the springs assists in preventing side movement of the saddle and is extremely flexible in use.

It will be seen that the saddle-supporting arrangement is exceedingly simple, is economical to manufacture, will properly operate to yieldingly support the weight of the rider, and is extremely unlikely to get out of repair. Moreover, the necessary adjustments for height and for fore and aft inclinations may be readily effected by children or mechanically unskilled users; the above features being true of both general forms herein shown and described.

To further relieve shock to the body of the rider, a cushion pad 50 is provided on top of the shell 30, and this, as illustrated, comprises molded rubber or its equivalent, with a suitable sheet-metal reenforce element 51; the latter (and, of course, the rubber) generally conforming to the top surface of the shell. The stock may be solid rubber or tough sponge rubber and, in any event, is highly yielding and pliable.

The reenforce element 51 may be marginally and otherwise embedded in the body of rubber which generally overlies it as shown; the reinforce element having a slightly raised perimetral flange at 53, about which the rubber is molded, and/or openings 54, see Figs. 9 and 10, with which the rubber stock interlocks to some extent in the mold.

An important feature is that the outer marginal portions of the composite cushion pad (the non-reinforced portions) are of such shape that when the pad is attached to the metal shell e. g. the margins will, of themselves, hug the underlying support, thus obviating the necessity for adhesives and like expedients. This device is illustrated particularly in Fig. 8, wherein it will be noted that the undersurfaces of the downwardly curved marginal portions of the pad (at 50a and 50b) which portions lie beyond the reenforce at both ends, are formed on shorter radii than are the downwardly curved marginal flange surfaces (34a and 34b) on the metal shell, which said marginal portions of the rubber member engage when the parts are assembled. The result is that the rubber remains stressed,—tightly embracing the metal so long as there is any "life" in the rubber.

To attach the cushion pad to the shell 30, down-struck lugs or tongues 55 may be formed on the reenforce member 51, these being spaced so as to align with and enter appropriate openings, such as slots 56 in the shell 30. The lugs or tongues are adapted to be bent over to engage the undersurface of the shell adjacent the openings or slots (not illustrated).

The rubber cushion pad may overlie as much of the metal shell as desired, and may, in fact, depend beyond the perimetral flange thereof; and any appropriate surface embossing or decoration may be applied to or effected on its top surface, say in simulation of leather.

The manner in which the cushion pad may be applied to the saddle member 28 of Figs. 1 to 4, in the event the saddle member 28 is formed of metal or other hard substance, (or to the member 11 when this is properly shaped to form the upper saddle member), will be clearly understood from the above description, and therefore specific illustration of the cushion pad arrangement in connection with said group of figures is deemed unnecessary.

I claim:

1. In a cycle having a hollow back-bone member with an opening in the top wall thereof, upstanding flanges associated with said opening and disposed at opposite sides of it, a sheet-metal bracket having a flange adapted to enter the opening, said bracket flange being carried on the aforesaid flanges, and a saddle supported by the bracket.

2. A cycle saddle construction, comprising an inverted U-shaped bracket, the leg portions of which are adapted to be adjustably supported in a top opening of a cycle frame, and a saddle frame member having downwardly extending side flanges lying in embracing relation to the sides of the U-shaped member and being yieldingly supported on said member.

3. In a cycle having a main longitudinal frame member with an elongated upwardly facing opening therein, a saddle support disposed in said opening and being vertically and tiltably adjustable therein, means to secure the support in various elevated and/or tilted positions relative to the frame member, and a saddle mounted on said support.

4. In a cycle of the type having a hollow main frame element, an upwardly facing opening in the element, parallel upstanding apertured ears at the sides of the opening, a saddle-supporting member having a generally vertical series of transverse openings at or near one end adapted to align with the openings of said ears and selectively receive attaching means passing therethrough, vertically spaced abutments at or near the opposite end of the supporting member, cooperating abutment means on the frame element engageable therewith selectively to support the member at different heights, and a saddle surmounting the supporting member.

5. In a device of the class described, in combination, a hollow frame member having an elongated aperture in its upper wall, means forming a tongue at one end of the aperture, a saddle-supporting member having a portion adapted to extend into the opening, a series of notches on said portion adapted to selectively engage the tongue, means to detachably secure the opposite end of the supporting member to the hollow member in various relatively elevated positions, and a saddle mounted on the supporting member.

6. A cycle saddle structure, adapted to be supported on a hollow cycle frame member having an upwardly facing elongated opening therein, a sheet metal supporting element having a flange extending longitudinally of the saddle and adjustably secured in such opening, said element having a forwardly extending arm adapted to overhang the frame member and having a rearwardly disposed spring perch, a saddle pivotally secured to the arm and extending over the spring perch, and spring means operatively interposed between the saddle and spring perch.

7. In a cycle of the class described, a hollow frame member having an opening in its top side, a vertically adjustable bracket movable in said opening, said bracket having a forward extension above the top of the frame member, a sheet-metal saddle member pivotally secured to said extension and extending rearwardly from the pivot, a rearward extension on said bracket having flanges forming spring supporting ears, flanges forming similar ear members on the underside of the saddle member in substantially vertical alignment with respective aforesaid ears, and coil springs having end portions adapted for attachment to respective ears of the saddle member and bracket.

8. In a cycle, a saddle supporting member adapted to be mounted on a cycle frame, said member having an upstanding part, a saddle element overlying the supporting member and having substantially rigid means in spaced relation to said part longitudinally of the saddle, a compressible element disposed between said part and said means, and a coupling device for said part and means, said device operating to apply predetermined compressive force on said element.

9. In a cycle saddle, a relatively hard body of saddle shape, a cushioning pad of pliable, yieldable material adapted to be attached to said body, with its marginal edge portions in overlying relation to the upper body surface, said marginal edge portions of the pad being shaped so that when the intermediate portions of the pad are held in contact with the underlying body, the marginal portions of the pad will be bent out of normal position whereby to hug the underlying body surfaces with relatively increased force.

10. In a cycle saddle, a relatively hard body of saddle shape, having downwardly extending marginal surface portions and a rubber pad adapted to be attached to said body, said pad having feather edged marginal portions in overlying relation to the downwardly extending marginal portions of the body surface, said marginal portions of the pad being formed so that when the intermediate portions of the pad are held in contact with the underlying body, the marginal portions of the pad will be bent outwardly whereby to hug the underlying downwardly extending body surfaces with relatively increased force.

11. In a cycle saddle, a sheet-metal shell of substantially conventional saddle shape, apertures through said shell, a rubber pad having a reinforcing plate embedded therein, and means on the underside of said plate adapted to enter the apertures to secure the pad to the shell.

12. In a cycle saddle having a sheet-metal saddle frame of substantially conventional saddle shape, said frame having apertures extending therethrough, a rubber body having relatively rigid means embedded therein, said means having tongues adapted to enter the apertures and interlock therewith, said rubber body having downwardly curved marginal non-reinforced portions peripherally surrounding said rigid means, and shaped in a manner to cause it to continuously hug the underlying frame surface when the tongues are brought into operative relationship with the apertures.

13. In a cycle saddle, having a substantially rigid shell forming a saddle frame, the combination therewith of a rubber pad adapted to be secured to the frame on its top side and having marginal portions which decrease in cross-section substantially to a thin edge, said marginal portions being more sharply curved in cross-section than the surfaces of the frame which said portions are adapted to overlie.

14. In a cycle having a longitudinal frame provided with a top opening having parallel sides, a sheet-metal saddle support having spaced flanges adapted to occupy said opening, embraced by said sides, and means co-operating with the flanges to secure the support in various selected elevated and tilted positions relative to said opening, and a saddle mounted on said support.

15. In a cycle, a longitudinal hollow frame member having a top opening, a saddle bracket having a portion extending into said opening and means externally of said frame member secured thereto on opposite sides of the opening and supportingly connected to the saddle bracket.

HERMAN L. KRAEFT.